United States Patent
Yang et al.

(10) Patent No.: US 10,966,018 B2
(45) Date of Patent: *Mar. 30, 2021

(54) SYSTEMS AND METHODS FOR AUTOMATIC SPEECH RECOGNITION

(71) Applicant: ADEMCO INC., Golden Valley, MN (US)

(72) Inventors: Xiukuan Yang, Shanghai (CN); Chao Xiao, Shanghai (CN); Tao Chai, Shanghai (CN)

(73) Assignee: Ademco Inc., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,078

(22) Filed: Nov. 25, 2019

(65) Prior Publication Data

US 2020/0092640 A1 Mar. 19, 2020

Related U.S. Application Data

(63) Continuation of application No. 15/833,045, filed on Dec. 6, 2017, now Pat. No. 10,524,046.

(51) Int. Cl.
*H04R 3/00* (2006.01)
*H04R 29/00* (2006.01)
(Continued)

(52) U.S. Cl.
CPC ............. *H04R 1/406* (2013.01); *G10L 15/22* (2013.01); *G10L 15/28* (2013.01); *H04R 1/08* (2013.01);
(Continued)

(58) Field of Classification Search
CPC ....... G10L 15/02; G10L 15/22; G10L 15/223; G10L 15/24; G10L 11/00; G10L 2021/02166; G10L 2201/401; G10L 15/28; G09C 1/00; H04R 3/00; H04R 3/005; H04R 3/04; H04R 3/10; H04R 1/406; H04R 1/1041; H04R 1/14; H04R 1/20; H04R 1/222; H04R 1/265; H04R 1/08; H04R 2201/40; H04R 2201/401; H04R 2203/00; H04R 2203/12; H04R 29/004; H04R 29/005; H04R 29/006; H04R 25/40; H04R 25/402; H04R 25/405; H04R 25/407; H04R 1/083; H04R 1/342; H04R 1/24; H04R 1/38; H04R 19/04; H04R 19/01;
(Continued)

(56) References Cited

U.S. PATENT DOCUMENTS 9,240,182 B2  1/2016 Lee et al.
9,354,310 B2  5/2016 Visser et al.
(Continued)

OTHER PUBLICATIONS

Extended European search report for corresponding EP patent application 18189290.2, dated Nov. 13, 2018.

*Primary Examiner* — Leshui Zhang
(74) *Attorney, Agent, or Firm* — Fredrikson & Byron, P.A.

(57) ABSTRACT

Systems and methods for automatic speech recognition are provided. Some methods can include a sensor detecting a relative location of a user within one of a plurality of voice pickup areas of a multi-directional microphone array and the multi-directional microphone array activating a direction setting of the multi-directional microphone array based on the relative location of the user within the one of the plurality of voice pickup areas.

13 Claims, 3 Drawing Sheets

(51) Int. Cl.
*H04R 1/40* (2006.01)
*H04R 1/08* (2006.01)
*G10L 15/22* (2006.01)
*G10L 15/28* (2013.01)
*G10L 21/0216* (2013.01)

(52) U.S. Cl.
CPC ............ *H04R 3/005* (2013.01); *H04R 29/005* (2013.01); *G10L 2021/02166* (2013.01); *H04R 2201/401* (2013.01)

(58) Field of Classification Search
CPC .......... H04R 9/08; H04R 11/04; H04R 17/02; H04R 21/02
USPC ......... 381/92, 26, 86, 91, 95, 111, 112, 113, 381/114, 115, 122, 123, 355, 356, 358; 704/273, 275, 274, 246, 270, 231, 260; 379/69, 70, 79, 80, 902; 700/94; 455/570, 569.1, 114.2, 220, 221, 222, 223
See application file for complete search history.

(56) References Cited

U.S. PATENT DOCUMENTS

| | | | |
|---|---|---|---|
| 2003/0118200 A1* | 6/2003 | Beaucoup | H04M 3/56 381/110 |
| 2012/0062729 A1* | 3/2012 | Hart | H04N 7/142 348/135 |
| 2012/0327115 A1 | 12/2012 | Chhetri et al. | |
| 2014/0153747 A1 | 6/2014 | Contolini et al. | |
| 2014/0278394 A1 | 9/2014 | Bastyr et al. | |
| 2016/0249132 A1 | 8/2016 | Oliaei | |
| 2018/0176680 A1* | 6/2018 | Knight | H04R 1/406 |

* cited by examiner

SYSTEMS AND METHODS FOR AUTOMATIC SPEECH RECOGNITION

CROSS-REFERENCE TO RELATED APPLICATIONS

This application is a continuation of and claims the benefit of the filing date of U.S. application Ser. No. 15/833,045 filed Dec. 6, 2017.

FIELD

The present invention relates generally to speech recognition systems and methods. More particularly, the present invention relates to systems and methods for activating a direction setting of a multi-directional microphone array in response to a sensor determining a relative location of a user within one of a plurality of voice pickup areas of the multi-directional microphone array.

BACKGROUND

Known speech recognition systems and methods use a multi-directional microphone array operating initially in a directionless setting. The multi-directional microphone array detects a wakeup command from within one of a plurality of voice pickup areas and, in response, activates a direction setting associated with the one of the plurality of voice pickup areas that receives the wakeup command to enhance speech recognition of forthcoming speech coming from the one of the plurality of voice pickup areas. However, such known systems and methods do not activate the direction setting prior to receiving the wakeup command, which results in unintended or missed activation of the multi-directional microphone array caused by interference during operation in the directionless setting.

In view of the above, there is a continuing, ongoing need for improved systems and methods.

DETAILED DESCRIPTION

Figure 1:
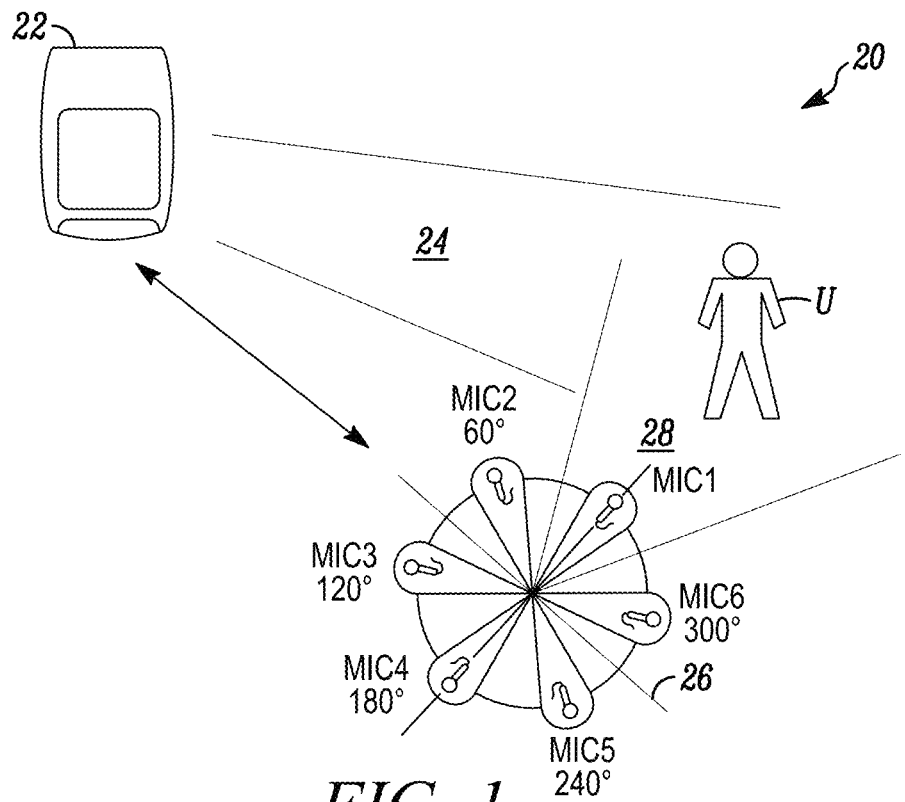
FIG. 1 is a block diagram of a sensor and a multi-directional microphone array in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for automatic speech recognition. For example, systems and methods disclosed herein can include a sensor detecting a relative location of a user within one of a plurality of voice pickup areas of a multi-directional microphone array and the multi-directional microphone array activating a direction setting of the multi-directional microphone array based on the relative location of the user within the one of the plurality of voice pickup areas, wherein the direction setting enhances speech recognition by the multi-directional microphone array from the relative location of the user within the one of the plurality of voice pickup areas.

Systems and methods as disclosed herein may be deployed as standalone devices interacting together or as a part of home automation systems or security systems. It is to be understood that such systems can include, but are not limited to systems that include a control panel in communication with a sensor or a plurality of sensors and a multi-directional microphone array or a plurality of multi-directional microphone arrays deployed in a region In accordance with disclosed embodiments, each of a plurality of sensors may be positioned to detect a respective location of the user within a respective one of the plurality of voice pickup areas of the multi-directional microphone array. Accordingly, the sensor may be positioned to detect the relative location of the user within the one of the plurality of voice pickup areas of the multi-directional microphone array. Each of the plurality of voice pickup areas may detect sound or recognize voice commands from a respective direction surrounding the multi-directional microphone array. Accordingly, as the user enters a field of view or detection area of the sensor, the sensor may detect the relative location of the user that corresponds to the one of the plurality of voice pickup areas. In response to the sensor detecting the relative location of the user, the multi-directional microphone array may activate a direction setting associated with the one of the plurality of voice pickup areas. The direction setting may be used to enhance speech recognition by the multi-directional microphone array in the direction of the one of the plurality of voice pickup areas, thereby enhancing the ability of the multi-directional microphone array to receive wakeup commands from the relative location of the user, which can facilitate avoiding or reducing unintended or missed wakeup commands. In some embodiments, the sensor can include a microwave-based location sensor. However, additional types of sensors known in the art for detecting the relative location of the user may come within the spirit and scope of disclosed embodiments.

In some embodiments, when the direction setting is activated, the multi-directional microphone array may detect the wakeup command from the relative location of the user and, in response, may enter an active listening mode to identify additional commands or speech commands coming from the direction of the relative location of the user. In some embodiments, the direction setting may include directing a beamforming function of the multi-directional microphone array toward the relative location of the user within the one of the plurality of voice pickup areas.

In some embodiments, a control panel or similar control unit may be electrically coupled to the sensor and the multi-directional microphone array. The control panel may transfer data indicative of the relative location of the user between the sensor and the multi-directional microphone array using either wired or wireless communication methods. In some embodiments, the sensor can be paired with the multi-directional microphone array to directly communicate the relative location of the user to the multi-directional microphone array. In some embodiments, communication of the relative location of the user from the sensor to the multi-directional microphone array, either directly or through the control panel, can be accomplished using an Internet-based communication protocol.

In some embodiments, a plurality of sensors and a plurality of multi-directional microphone arrays may be placed throughout the region and coupled to the control panel. Each of the plurality of multi-directional microphone arrays may include a respective plurality of voice pickup areas that operate as described herein. The respective plurality of voice pickup areas may detect sound or recognize voice commands from multiple different directions surrounding a respective one of the plurality of multi-directional microphone arrays.

In some embodiments, as the user enters the field of view or the detection area of one of the plurality of sensors, the one of the plurality of sensors may detect the relative location of the user within the region and forward the relative location to the control panel. In response to the one of the plurality of sensors detecting the relative location of the user, the control panel may identify one of the plurality of multi-directional microphone arrays for which one of the respective plurality of voice pickup areas is closest to or within range of the relative location of the user and may send the relative location to the one of the plurality of multi-directional microphone arrays.

In some embodiments, the one of the plurality of multi-directional microphone arrays may activate a respective direction setting associated with the one of the respective plurality of voice pickup areas. The respective direction setting may be used to enhance speech recognition by the one of the plurality of multi-directional microphone arrays in the direction of the one of the respective plurality of voice pickup areas, thereby enhancing the ability of the plurality of multi-directional microphone arrays to receive wakeup commands from the relative location of the user within the region, which can facilitate avoiding or reducing unintended or missed wakeup commands. In some embodiments, the plurality of sensors can include microwave-based location sensors. However, additional types of sensors known in the art for detecting the relative location of the user come within the spirit and scope of disclosed embodiments.

In some embodiments, when the respective direction setting is activated, the one of the plurality of multi-directional microphone arrays may detect wakeup commands from the relative location of the user within the region and, in response, may enter the active listening mode to identify the additional commands or the speech commands from within the one of the respective plurality of voice pickup areas. In some embodiments, the respective direction setting may include directing the beamforming function associated with the one of the respective plurality of voice pickup areas of the one of the plurality of multi-directional microphone arrays toward the relative location of the user within the region.

Figure 2:
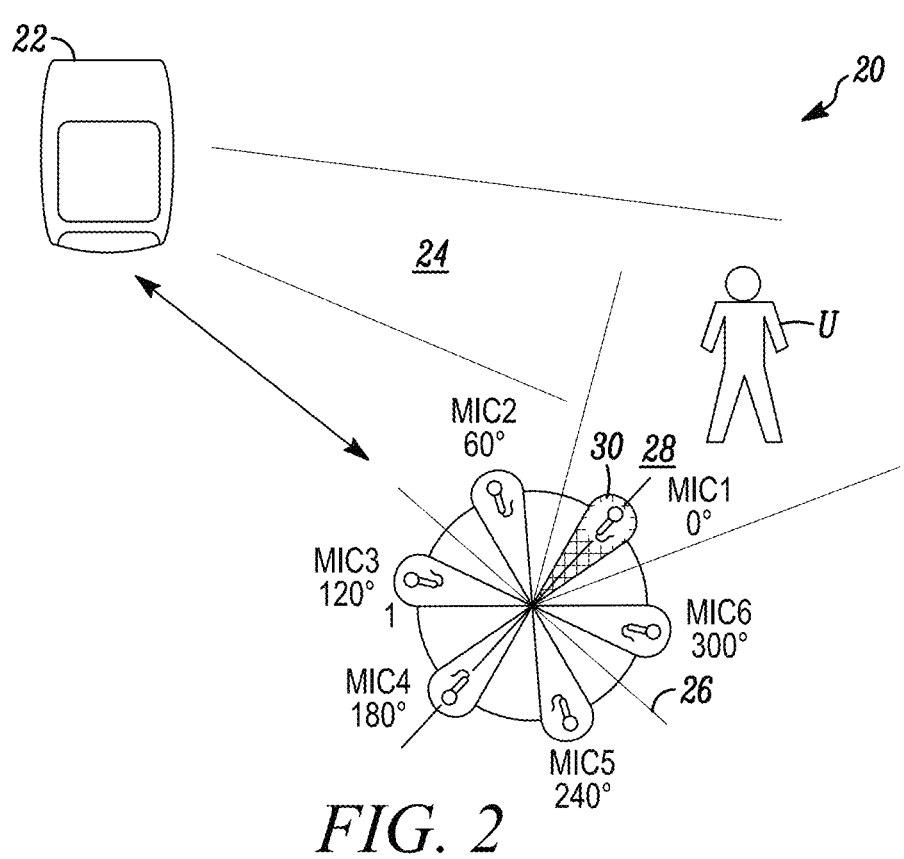
FIG. 2 is a block diagram of a sensor and a multi-directional microphone array in accordance with disclosed embodiments.

FIG. 1 and FIG. 2 are block diagrams of a system 20 for automatic speech recognition in accordance with disclosed embodiments. As shown in FIG. 1, the system 20 can include a sensor 22 (e.g. a microwave sensor, PIR sensor, RF sensor, location sensor, etc.) and a multi-directional microphone array 26. The sensor 22 can detect when a relative location of a user U is within a detection area 24 of the sensor 22 corresponding to a specific voice pickup area 28 of the multi-directional microphone array 26 and can communicate the relative location of the user U to the multi-directional microphone array 26. In some embodiments, the specific voice pickup area 28 can be one of a plurality of voice pickup areas of the multi-directional microphone array 26.

As shown in FIG. 2, the multi-directional microphone array 26 can activate a direction setting 30 in response to receiving the relative location of the user U from the sensor 22. The direction setting may correspond to the specific voice pickup area 28 that is associated with the relative location of the user U. In some embodiments, the direction setting can activate a beamforming function of the multi-directional microphone array directed toward the relative location of the user U.

Figure 3:
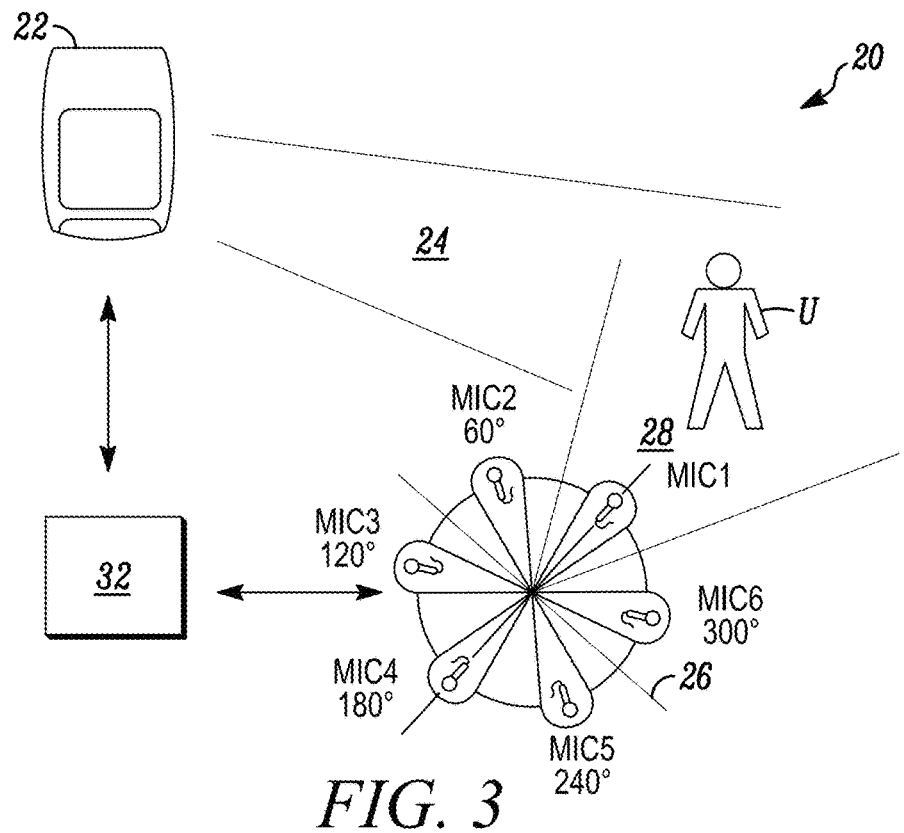
FIG. 3 is a block diagram of a sensor, a multi-directional microphone array, and a control panel in accordance with disclosed embodiments.
Figure 4:
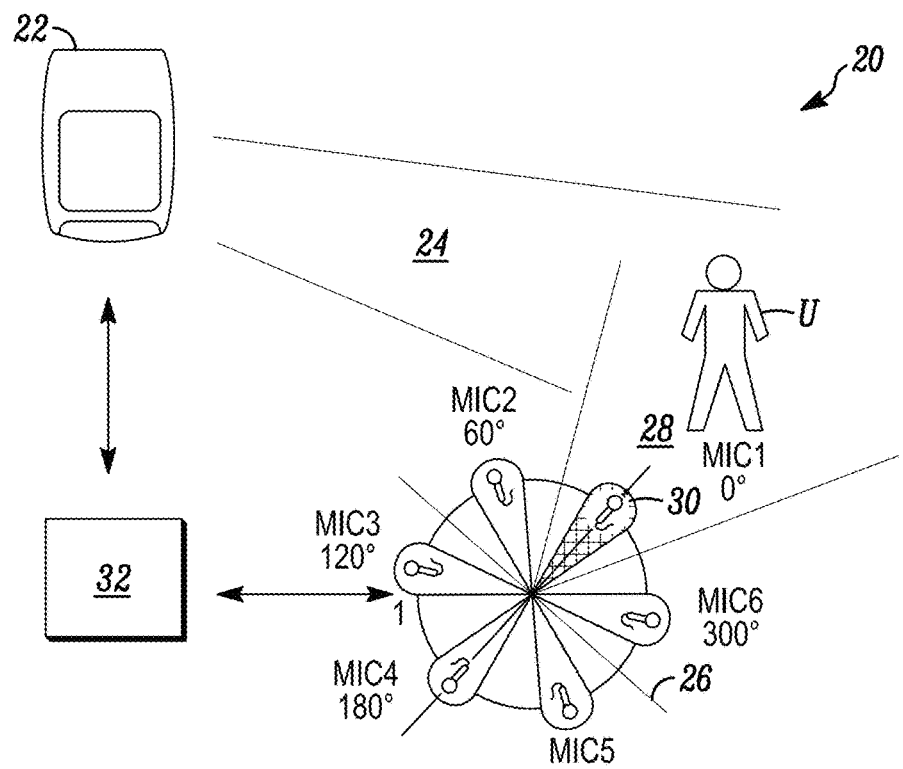
FIG. 4 is a block diagram of a sensor, a multi-directional microphone array, and a control panel in accordance with disclosed embodiments.

In some embodiments, as shown in FIG. 3 and FIG. 4, the system 20 for automatic speech recognition can include a control panel 32 that can communicate with the sensor 22 and the multi-directional microphone array 26. The control panel 32 can receive first data indicative of the relative location of the user U from the sensor 22 and send second data indicative of the relative location of the user U to the multi-directional microphone array 26.

Figure 5:
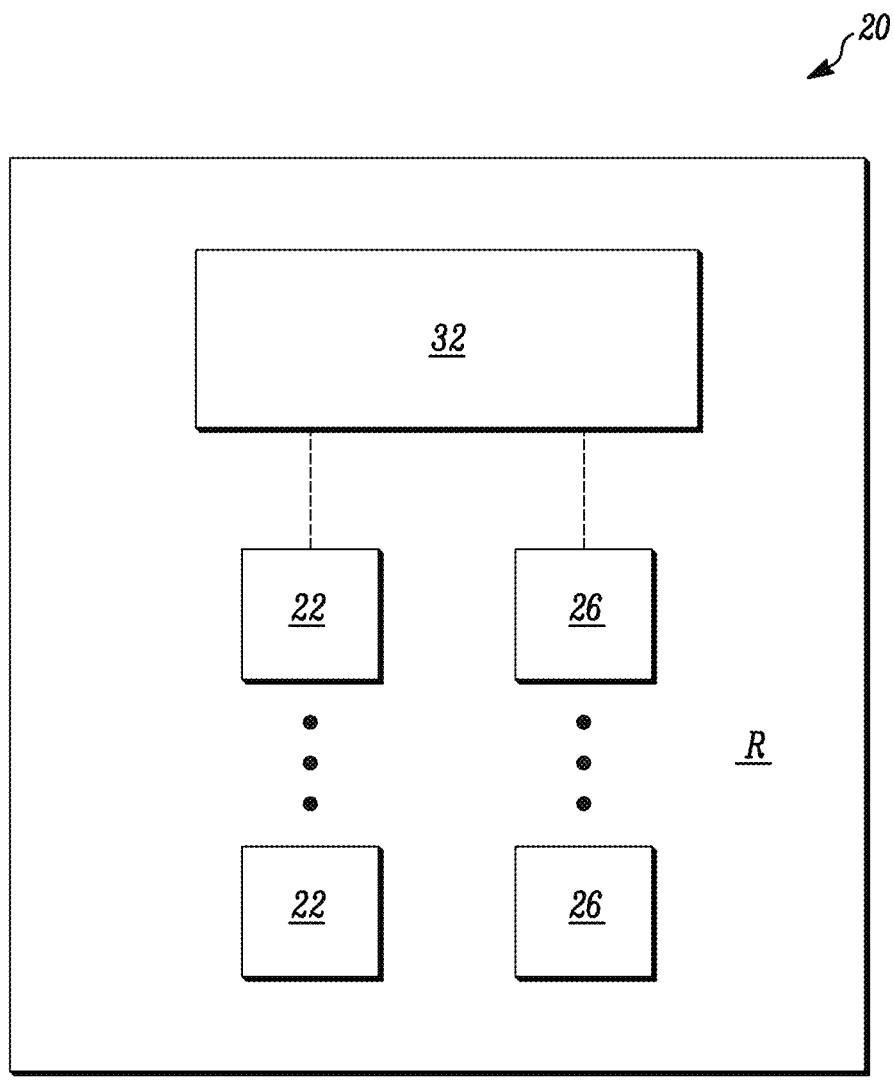
FIG. 5 is a block diagram of a plurality of sensors, a plurality of multi-directional microphone arrays, and a control panel deployed in a region in accordance with disclosed embodiments.

In some embodiments, as shown in FIG. 5, the system 20 for automatic speech recognition can include a plurality of sensors 22 and a plurality of multi-directional microphone arrays 26 deployed in a region R each of which can communicate with the control panel 32. As the user U enters a field of view detection area of one of the plurality of sensors 22, the one of the plurality of sensors 22 may detect the relative location of the user U within the region R and forward the relative location to the control panel 32. In response to the one of the plurality of sensors 22 detecting the relative location of the user U, the control panel 32 may identify one of the plurality of multi-directional microphone arrays 26 for which one of a respective plurality of voice pickup areas is proximate to the relative location of the user U and may send the relative location to the one of the plurality of multi-directional microphone arrays. Upon receiving the relative location of the user U from the control panel 32, the one of the plurality of multi-directional microphone arrays may operate to activate a direction setting as described herein.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
   a multi-directional microphone array that includes a plurality of microphones each of which corresponds to a respective one of a plurality of voice pickup areas; and
   control circuitry in communication with the multi-directional microphone array;
   wherein the control circuitry receives a first signal from a first sensor in or proximate to a first of the plurality of voice pickup areas, the first signal indicative of the first sensor detecting a user in the first of the plurality of voice pickup areas, wherein, responsive to the first signal, the control circuitry transmits a second signal to the multi-directional microphone array with instructions to activate a first of the plurality of microphones corresponding to the first of the plurality of voice pickup areas to enhance speech recognition by the multi-directional microphone array within the first of the plurality of voice pickup areas, wherein, responsive to the second signal, the multi-directional microphone array activates the first of the plurality of microphones, wherein, after activation of the first of the plurality of microphones, the multi-directional microphone array detects a wakeup command from the first of the plurality of voice pickup areas, and wherein, responsive to the wakeup command from the first of the plurality of voice pickup areas, the multi-directional microphone array enters an active listening mode for the first of the plurality of voice pickup areas.

2. The system of claim 1 wherein each of the plurality of microphones is capable of detecting sound from a respective one of a plurality of directions surrounding the multi-directional microphone array.

3. The system of claim 2 wherein the sound includes a voice command of the user.

4. The system of claim 1 wherein the multi-dimensional microphone array activates a direction setting of the multi-dimensional microphone array based on a relative location of the user within a second of the plurality of voice pickup areas.

5. The system of claim 1 wherein, responsive to the second signal, the multi-directional microphone array directs a beamforming function of the first of the plurality of microphones towards the first of the plurality of voice pickup areas.

6. The system of claim 1 wherein the control circuitry uses the first signal to identify the first of the plurality of microphones.

7. The system of claim 1 wherein the first signal includes an indication of the first of the plurality of voice pickup areas.

8. The system of claim 1 wherein the first sensor includes a microwave sensor, a PIR sensor, an RF sensor, or a location sensor.

9. A method comprising:

associating each of a plurality of microphones of a multi-directional microphone array with a respective one of a plurality of voice pickup areas;

communicating with the multi-directional microphone array via control circuitry that receives a first signal from a sensor in or proximate to a first of the plurality of voice pickup areas, the first signal indicative of the sensor detecting a user in the first of the plurality of voice pickup areas;

responsive to the first signal, transmitting a second signal to the multi-directional microphone array via the control circuitry, the second signal including instructions to activate a first of the plurality of microphones corresponding to the first of the plurality of voice pickup areas to enhance speech recognition by the multi-dimensional microphone array within the first of the plurality of voice pickup areas;

responsive to the second signal, activating the first of the plurality of microphones;

after activation of the first of the plurality of microphones, detecting a wakeup command from the first of the plurality of voice pickup areas; and responsive to the wakeup command from the first of the plurality of voice pickup areas, entering an active listening mode for the first of the plurality of voice pickup areas.

10. The method of claim 9 wherein each of the plurality of microphones is capable of detecting sound from a respective one of a plurality of directions surrounding the multi-directional microphone array.

11. The method of claim 9 further comprising:

responsive to the second signal, directing a beamforming function of the first of the plurality of microphones towards the first of the plurality of voice pickup areas.

12. The method of claim 9 further comprising:

using the first signal to identify the first of the plurality of microphones.

13. The method of claim 10 further comprising:

using the first signal to identify the first of the plurality of microphones.

* * * * *